United States Patent
Takahashi et al.

(10) Patent No.: US 8,625,918 B2
(45) Date of Patent: Jan. 7, 2014

(54) IMAGE PROCESSING APPARATUS AND IMAGE PROCESSING METHOD

(75) Inventors: Yoshitomo Takahashi, Kanagawa (JP); Teruhiko Suzuki, Kanagawa (JP); Takuya Kitamura, Tokyo (JP)

(73) Assignee: Sony Corporation, Tokyo (JP)

( * ) Notice: Subject to any disclaimer, the term of this patent is extended or adjusted under 35 U.S.C. 154(b) by 262 days.

(21) Appl. No.: 13/178,609

(22) Filed: Jul. 8, 2011

(65) Prior Publication Data
US 2012/0014614 A1 Jan. 19, 2012

(30) Foreign Application Priority Data

Jul. 16, 2010 (JP) ................................. 2010-161658

(51) Int. Cl.
*G06K 9/00* (2006.01)
(52) U.S. Cl.
USPC ........................................................ 382/251
(58) Field of Classification Search
USPC ......... 382/232, 234, 236, 238, 248, 250–252; 348/42, 394.1–395.1, 400.1–403.1, 348/408.1–413.1, 416.1, 420.1–421.1, 348/430.1–431.1; 375/240.12–240.24
See application file for complete search history.

(56) References Cited

U.S. PATENT DOCUMENTS

| 6,430,224 | B1 * | 8/2002 | Naito et al. ............... 375/240.16 |
| 7,746,931 | B2 * | 6/2010 | Kato et al. ............... 375/240.16 |
| 8,139,150 | B2 * | 3/2012 | Nakamura et al. ......... 348/409.1 |
| 2013/0088570 | A1 | 4/2013 | Takahashi et al. |

FOREIGN PATENT DOCUMENTS

JP 2000-138938 A 5/2000

\* cited by examiner

*Primary Examiner* — Jose Couso
(74) *Attorney, Agent, or Firm* — Wolf, Greenfield & Sacks, P.C.

(57) ABSTRACT

An image processing apparatus includes a quantizer configured to quantize orthogonal transform coefficients of the difference in block units between a coding target picture and a prediction image, a predictor configured to conduct parallax prediction utilizing correlations between the coding target picture and a picture whose view differs from the coding target picture, and a quantization controller configured to determine a protected area that protects image quality from the parallax prediction results, and reduce the quantization step size of the quantizer for quantization of the protected area.

10 Claims, 7 Drawing Sheets

IMAGE PROCESSING APPARATUS AND IMAGE PROCESSING METHOD

BACKGROUND

The present disclosure relates to an image processing apparatus and an image processing method, and more specifically, to improving image quality for a multi-view image when coding an image with multiple views.

In recent years, there exist apparatus that handle image information as digital data, and in this regard conduct highly efficient information transfer and accumulation, such as an apparatus compliant with a technique such as MPEG that compresses by discrete cosine transform or other orthogonal transform and motion compensation, for example. Such apparatus are becoming widespread in broadcasting stations and general households.

Particularly, MPEG-2 (ISO/IEC 13818-2) is defined as a general-purpose image coding format, and currently is widely used in a broad range of applications for professional use and consumer use. Furthermore, an image coding format called H.264 and MPEG-4 Part 10 (hereinafter designated H.264/AVC (Advanced Video Coding)) is becoming standardized, and although more computation is demanded for its coding and decoding compared to coding formats such as MPEG-2, a higher coding efficiency can be realized. Also, with the coding of images by coding formats such as such as MPEG2, MPEG4, and H.264/AVC, it is typical to adjust the bitrate in order to obtain a higher coding efficiency. With bitrate adjustment, adaptive quantization taking vision characteristics into account is conducted. For example, in Japanese Unexamined Patent Application Publication No. 2000-138938, quantization is conducted by adaptively switching a quantization scale and an adjusted quantization scale according to the coding size of the current image, on the basis of a given parameter computed during the coding of a prior image.

SUMMARY

Meanwhile, with frame-sequential (FS) AVC and multi-view video coding (MVC), not only temporal prediction using temporal correlations between pictures, but also parallax prediction using correlations between pictures with different views, is conducted.

FIG. 1 illustrates reference relationships for prediction when coding two-view motion image data, for example. Herein, Cam0 is taken to be image data of a left-view image, and Cam1 is taken to be image data of a right-view image. The Cam1 image data is taken to be dependent view image data which is coded by using the Cam0 image data as image data of a reference picture. Image data referenced when coding image data of a dependent view is called base view image data.

The P picture (Pdv1) in the Cam1 image data takes as a reference picture the Cam0 I picture (Ib1), which is referenced by parallax prediction as indicated by the arrow. The P picture (Pdv3) in the Cam1 image data takes as reference pictures the Cam0 P picture (Pb3) which is referenced by parallax prediction and the P picture (Pdv1) which referenced by temporal prediction as indicated by the arrows. The B picture (Bdv2) in the Cam1 image data takes as reference pictures the Cam0 Bs picture (Bsb2) which is referenced by parallax prediction, and also the P picture (Pdv1) and the P picture (Pdv3) which are referenced by temporal prediction, as indicated by the arrows. Meanwhile, the P picture (Pb3) in the Cam0 image data takes as a reference picture the I picture (Ib1) which is referenced by temporal prediction as indicated by the arrow. The Bs picture (Bsb2) in the Cam1 image data takes as reference pictures the I picture (Ib1) and the P picture (Pb3) which are referenced by temporal prediction as indicated by the arrows.

Even in such encoding of multi-view images, the bitrate is adjusted in order to obtain a higher coding efficiency.

Accordingly, it is desirable to provide an image processing apparatus and an image processing method able to improve image quality for a multi-view image when coding an image with multiple views.

One embodiment is an image processing apparatus including a quantizer that quantizes orthogonal transform coefficients of the difference in block units between a coding target picture and a prediction image, a predictor that conducts parallax prediction utilizing correlations between the coding target picture and a picture whose view differs from the coding target picture, and a quantization controller that determines a protected area that protects image quality from the parallax prediction results, and modifies and reduces the quantization step size of the quantizer for quantization of the protected area.

In an embodiment, parallax prediction utilizing correlations between a coding target picture and a picture whose view differs from the coding target picture is conducted, and determination of a protected area is conducted using at least one from among a parallax vector detected by parallax prediction and error from when parallax compensation was conducted using the parallax vector. For example, in the case of using a parallax vector, the horizontal components of the parallax vector may be used, and a coding target block whose parallax vector is greater than statistics used as a basis for determining a protected area which are computed from the parallax vector of an already-coded picture (such as the average value of parallax vectors in a picture), and a coding target block whose parallax vector is greater than the parallax vector of an immediately preceding already-coded block, are determined to be a protected area. Also, in the case of using error from when parallax compensation was conducted, a coding target block whose error is greater than statistics used as a basis for determining a protected area which are computed from the error of an already-coded picture (such as the average value of the error in a picture) to be the protected area.

Another embodiment is an image processing method including quantizing orthogonal transform coefficients of the difference in block units between a coding target picture and a prediction image, conducting parallax prediction utilizing correlations between the coding target picture and a picture whose view differs from the coding target picture, and determining a protected area that protects image quality from the parallax prediction results, and reducing the quantization step size for quantization of the protected area.

According to an embodiment, parallax prediction utilizing correlations between a coding target picture and a picture whose view differs from the coding target picture is conducted, a protected area that protects image quality is determined from the parallax prediction results, and the quantization step size for quantization of the protected area is reduced. Consequently, the image quality of the protected area is protected during coding of a multi-view motion image, and the image quality for a multi-view image can be improved.

DETAILED DESCRIPTION OF EMBODIMENTS

Hereinafter, embodiments of the disclosed technology will be described. Herein, the description will be conducted in the following order.

1. Exemplary configuration of coding system
2. Configuration of image processing apparatus
3. Operation of image processing apparatus
   3-1. First operation of image processing apparatus
   3-2. Second operation of image processing apparatus
   3-3. Third operation of image processing apparatus
   3-4. Other operations of image processing apparatus
4. Case of conducting image coding by software processing <1. Exemplary Configuration of Coding System>

Figure 1:
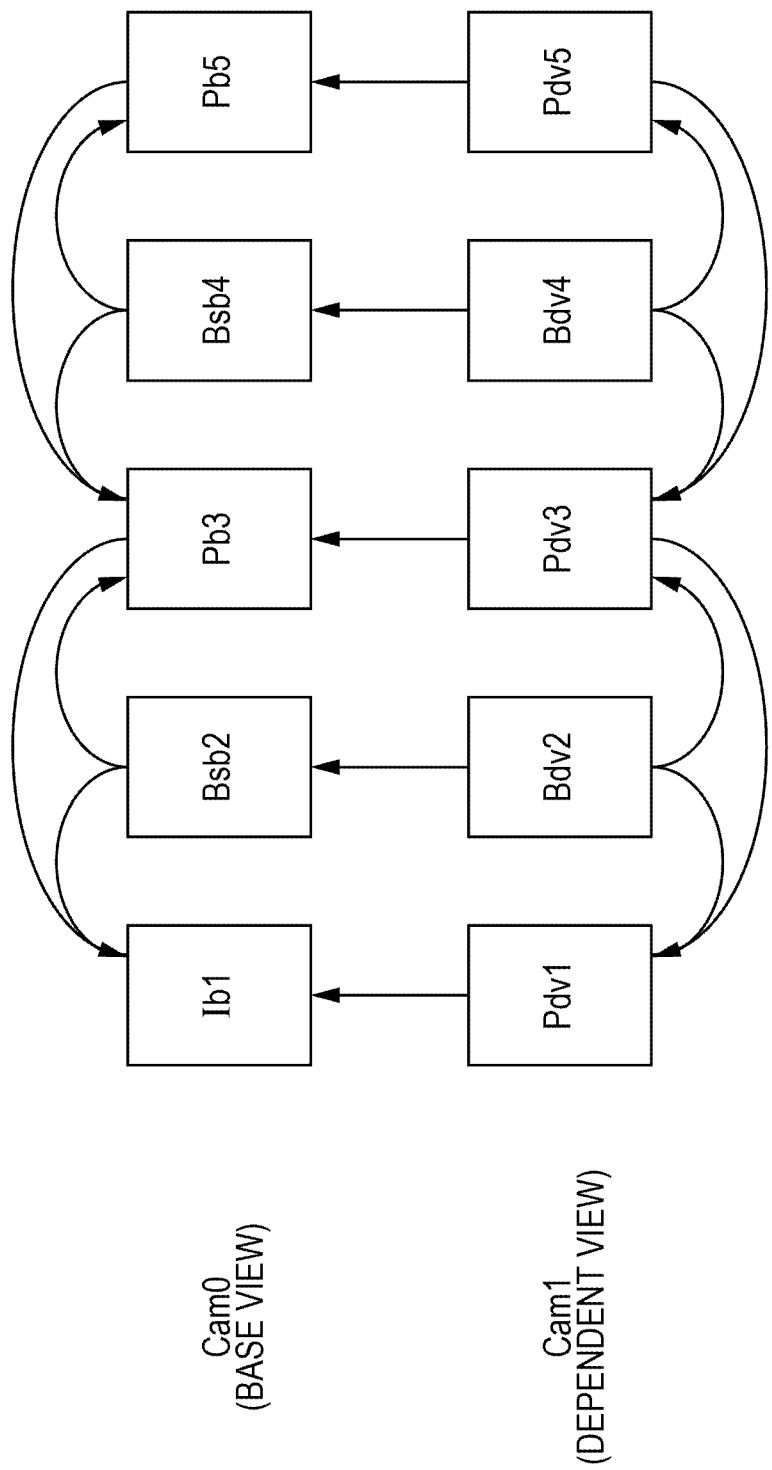
FIG. 1 illustrates prediction reference relationships when coding two-view motion image data.
Figure 2:
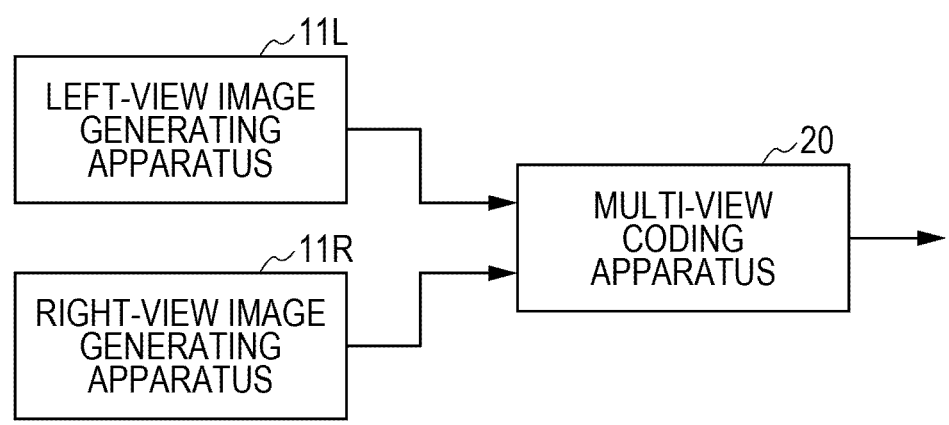
FIG. 2 illustrates a configuration of a coding system.

FIG. 2 is a diagram illustrating an exemplary configuration of a coding system to which the disclosed technology is applied. A coding system 10 includes a left-view image generating apparatus 11L, a right-view image generating apparatus 11R, and a multi-view coding apparatus 20.

The left-view image generating apparatus 11L is an imaging apparatus or image data generating apparatus that generates image data for a left-view image. The right-view image generating apparatus 11R is an imaging apparatus or an image data generating apparatus that generates a right-view image. The left-view image generating apparatus 11L and the right-view image generating apparatus 11R operate in synchronization.

Input into the multi-view coding apparatus 20 is image data for a left-view image generated by the left-view image generating apparatus 11L, and image data for a right-side view image generated by the right-view image generating apparatus 11R. The multi-view coding apparatus 20 respectively codes the image data for the left-side-view image and the image data for the right-side-view image, multiplexes the obtained coded data, and outputs the data as a single bitstream.

The multi-view coding apparatus 20 includes an image processing apparatus that codes image data for a left-view image and an image processing apparatus that codes image data for a right-view image. The image processing apparatus that codes image data for a left-view image codes image data for a left-view image as base view image data, for example. The image processing apparatus that codes image data for a right-view image codes image data for a right-side-view as dependent view image data which is coded by referencing the image data for a left-view image.

The image processing apparatus generate feedback information from the results of already-coded picture and block parallax prediction. The image processing apparatus determine an image quality protected area on the basis of the generated feedback information, and modifies the quantization step size to make it smaller when coding the protected area. In other words, the image processing apparatus improve image quality for a multi-view image by conducting adaptive quantization in multi-view image coding.

<2. Configuration of Image Processing Apparatus>

Figure 3:
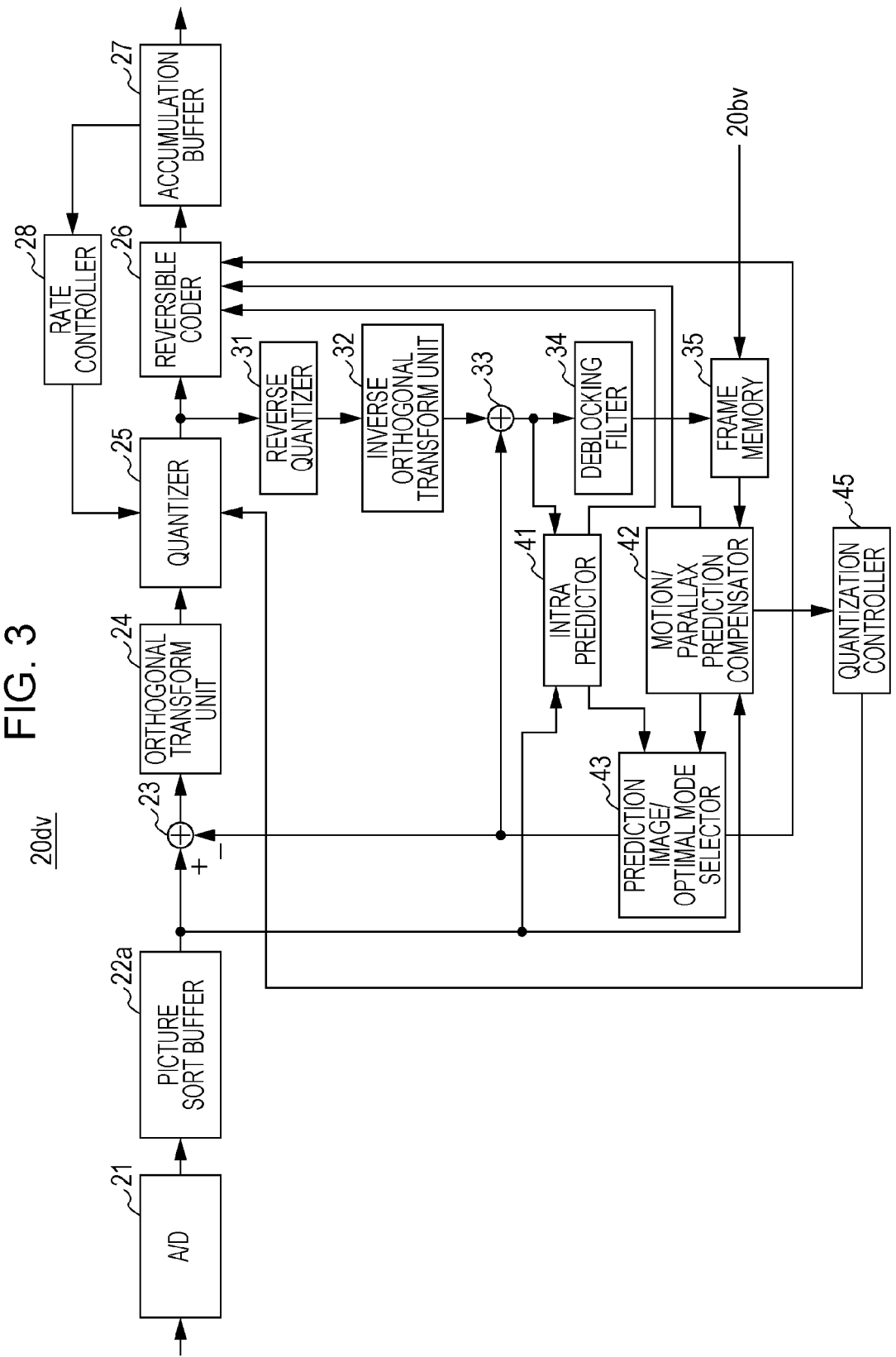
FIG. 3 illustrates a configuration of an image processing apparatus.

FIG. 3 illustrates a configuration of an image processing apparatus, such as an image processing apparatus 20 $dv$ that codes dependent view image data, for example. The image processing apparatus 20$dv$ is provided with an analog/digital converter (A/D converter) 21, a picture sort buffer 22, a subtractor 23, an orthogonal transform unit 24, a quantizer 25, a reversible coder 26, an accumulation buffer 27, and a rate controller 28. The image processing apparatus 20$dv$ also includes a reverse quantizer 31, an inverse orthogonal transform unit 32, an adder 33, a deblocking filter 34, and frame memory 35. The image processing apparatus 20$dv$ is additionally provided with an intra predictor 41, a motion/parallax prediction compensator 42, a prediction image/optimal mode selector 43, and a quantization controller 45.

The A/D converter 21 converts an analog image signal into digital image data and outputs the data to the picture sort buffer 22.

The picture sort buffer 22 sorts frames with respect to image data output from the A/D converter 21. The picture sort buffer 22 sorts frames corresponding to a GOP (Group of Pictures) structure for a coding process, and outputs sorted image data to the subtractor 23, the intra predictor 41, and the motion/parallax prediction compensator 42.

The subtractor 23 is supplied with image data output from the picture sort buffer 22 and prediction image data selected by the prediction image/optimal mode selector 43 later described. The subtractor 23 computes prediction error data, which is the difference between image data output from the picture sort buffer 22 and prediction image data supplied from the prediction image/optimal mode selector 43, and outputs the data to the orthogonal transform unit 24.

The orthogonal transform unit 24 conducts a discrete cosine transform (DCT), Karhunen-Loeve transform, or other orthogonal transform process on prediction error data output from the subtractor 23. The orthogonal transform unit 24 outputs transform coefficients obtained by conducting an orthogonal transform process to the quantizer 25.

The quantizer 25 is supplied with transform coefficients output from the orthogonal transform unit 24, a rate control signal from the rate controller 28 later described, and a comparison result signal from the quantization controller 45. The quantizer 25 quantizes the transform coefficients and outputs quantization data to the reversible coder 26 and the reverse quantizer 31. The quantizer 25 also switches the quantization step size on the basis of the rate control signal from the rate controller 28, and causes the bitrate of the quantization data to change. Additionally, the quantizer 25 improves image quality for a multi-view image by switching the quantization step size inside pictures for a multi-view image on the basis of a quantization control signal from the quantization controller 45.

The reversible coder 26 is supplied with quantized data output from the quantizer 25 and prediction mode information from the intra predictor 41 later described, the motion/parallax prediction compensator 42, and the prediction image/optimal mode selector 43. Herein, a macroblock type indicating the coding block size, a prediction mode, reference indices, etc. for intra prediction or inter prediction are included in prediction mode information. The reversible coder 26 conducts a coding process on quantized data according to variable-length coding or arithmetic coding, for example, generates a coded stream, and outputs the stream to the accumulation buffer 27. The reversible coder 26 also reversibly codes prediction mode information and adds the information to the coded stream's header information, for example.

The accumulation buffer 27 accumulates a coded stream from the reversible coder 26. The accumulation buffer 27 also outputs an accumulated coded stream at a transmission speed that depends on the transmission path.

The rate controller 28 monitors free space in the accumulation buffer 27, generates a rate control signal according to the free space, and outputs the signal to the quantizer 25. The rate controller 28 acquires information indicating free space from the accumulation buffer 27, for example. In the case where free space is becoming low, the rate controller 28 lowers the bitrate of quantized data with a rate control signal. Also, in the case of a sufficiently large amount of free space in the accumulation buffer 27, the rate controller 28 raises the bitrate of quantized data with a rate control signal.

The reverse quantizer 31 conducts reverse quantization process on quantized data supplied from the quantizer 25. The reverse quantizer 31 outputs transform coefficients obtained by conducting a reverse quantization process to the inverse orthogonal transform unit 32.

The inverse orthogonal transform unit 32 conducts an inverse orthogonal transform process on transform coefficients supplied from the reverse quantizer 31, and outputs data obtained as a result to the adder 33.

The adder 33 generates image data of a reference picture by adding data supplied from the inverse orthogonal transform unit 32 to prediction image data supplied from the prediction image/optimal mode selector 43. The adder 33 outputs this image data to the deblocking filter 34 and the intra predictor 41.

The deblocking filter 34 conducts a filter process for decreasing blocking artifacts that occur when coding images. The deblocking filter 34 conducts a filter process that removes blocking artifacts from image data supplied from the adder 33, and outputs filtered image data to the frame memory 35.

The frame memory 35 holds filtered image data supplied from the deblocking filter 34 and reference picture image data supplied from an image processing apparatus 20bv that codes the base view.

The intra predictor 41 uses coding target reference picture image data output from the picture sort buffer 22 and image data supplied from the adder 33 to conduct an intra prediction process in all candidate intra prediction modes. Additionally, the intra predictor 41 computes a cost function value for each intra prediction mode, and selects the intra prediction mode with the minimum computed cost function, i.e. the intra prediction mode with the best coding efficiency, as the optimal intra prediction mode. The intra predictor 41 outputs prediction image data generated with the optimal intra prediction mode, prediction mode information regarding the optimal intra prediction mode, and the cost function value of the optimal intra prediction mode to the prediction image/optimal mode selector 43. The intra predictor 41 also outputs prediction mode information regarding the intra prediction mode to the reversible coder 26 in the intra prediction process for each intra prediction mode, in order to obtain resulting code sizes used to compute cost function values as described later. Herein, a method implemented in the H.264/AVC reference software, called JM (Joint Model), can be given as an example of a method for computing cost function values.

The motion/parallax prediction compensator 42 conducts a prediction/compensation process on each image of coding block size in a coding target picture read out from the picture sort buffer 22. The motion/parallax prediction compensator 42 uses coding block image data and image data filtered for deblocking read out from the frame memory 35 to predict and detect motion vectors. The motion/parallax prediction compensator 42 also uses coding block image data and base view image data to predict and detect parallax vectors. Additionally, the motion/parallax prediction compensator 42 performs a compensation process on a reference picture on the basis of detected motion vectors (parallax vectors) to generate a prediction image.

Also, the motion/parallax prediction compensator 42 computes a cost function value for each block size and reference picture, and selects the block size and reference picture with the minimum cost function value as the optimal inter prediction mode. The motion/parallax prediction compensator 42 outputs prediction image data generated with the optimal inter prediction mode, prediction mode information regarding the optimal inter prediction mode, and the cost function value of the optimal inter prediction mode to the prediction image/optimal mode selector 43. The motion/parallax prediction compensator 42 also outputs prediction mode information regarding the inter prediction mode to the reversible coder 26 in the inter prediction process at the block size of each prediction mode, in order to obtain resulting code sizes used to compute cost function values.

The prediction image/optimal mode selector 43 compares a cost function value supplied from the intra predictor 41 to a cost function value supplied from the motion/parallax prediction compensator 42, and selects the smaller cost function value as the optimal mode with the best coding efficiency. The prediction image/optimal mode selector 43 also outputs prediction image data generated in the optimal mode to the subtractor 23 and the adder 33. Additionally, the prediction image/optimal mode selector 43 outputs prediction mode information on the optimal mode (macroblock type, prediction mode, reference index, etc.) to the reversible coder 26.

The quantization controller 45 determines a protected area from the results of parallax prediction conducted at the motion/parallax prediction compensator 42. Additionally, the quantization controller 45 generates and supplies a quantization control signal based on the determination result to the quantizer 25. In so doing, the quantization controller 45 modifies the quantization step size in the quantizer 25 when coding the protected area, decreasing the quantization step size and protecting the image quality of the protected area. In this way, the quantization controller 45 adaptively switches the quantization step size on the basis of parallax prediction results when coding a multi-view image.

<3. Operation of Image Processing Apparatus>

When coding a multi-view image, an image processing apparatus modifies and decreases the quantization step size while coding a protected area, thereby protecting image quality and improving the subjective image quality of a multi-view image. Also, an image processing apparatus determines a protected area by using at least one from among a parallax vector detected by parallax prediction and the error when that parallax vector is used to conduct parallax compensation. An image processing apparatus, on the basis of parallax prediction results, determines a subject positioned in front (a 3D object) or the boundary of a 3D object as a protected area.

<3-1. First Operation of Image Processing Apparatus>

In a first operation of an image processing apparatus, the case of determining a protected area using a parallax vector of a coding target macroblock and a parallax vector detected in an already-coded picture will be described. Herein, the horizontal components of parallax vectors are used to determine a protected area in the case of generating base view and dependent view image data by differentiating the positions of the left view and the right view in the horizontal direction only.

Figure 4:
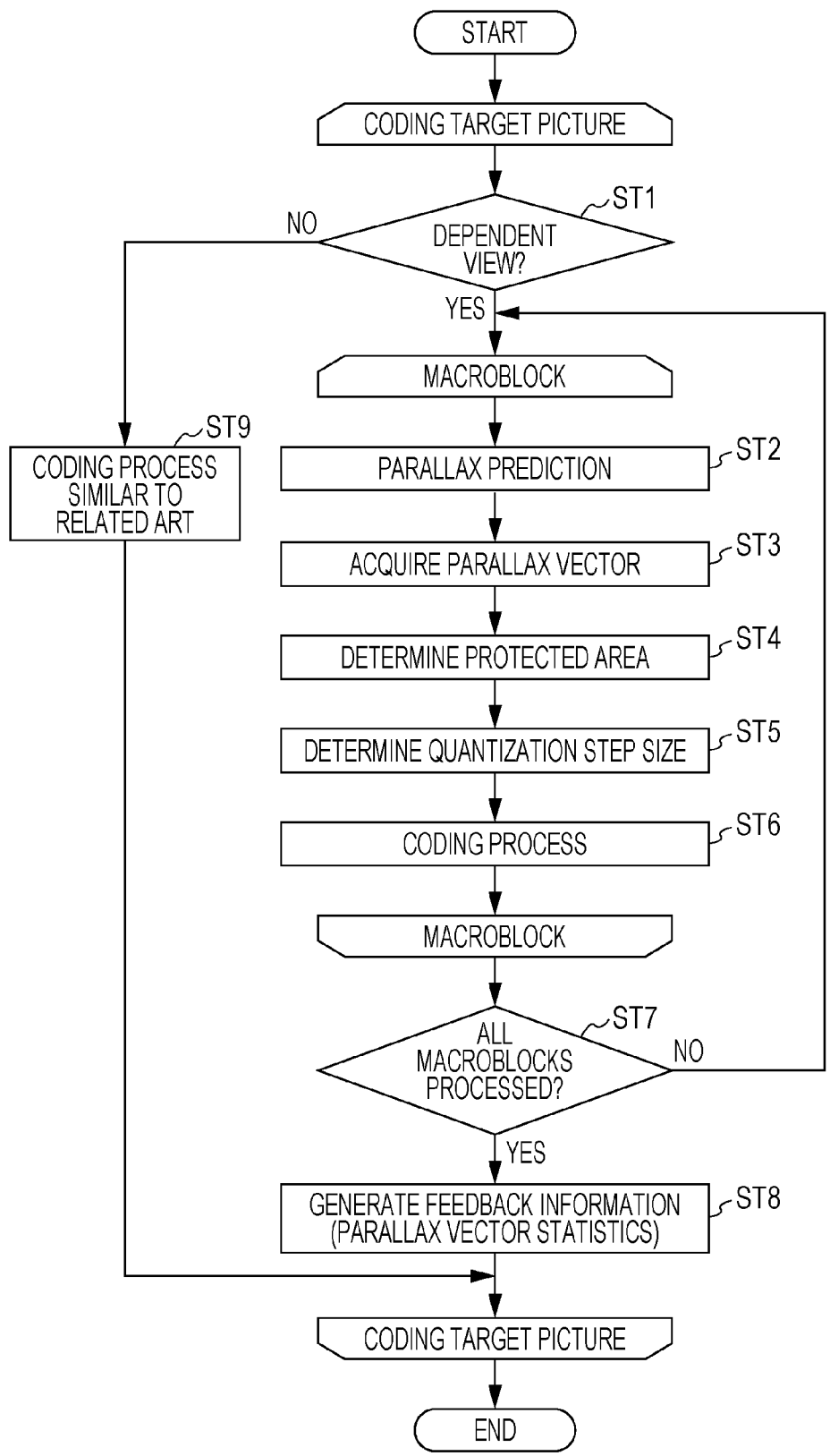
FIG. 4 is a flowchart illustrating a first operation of an image processing apparatus.

FIG. 4 is a flowchart illustrating a first operation of an image processing apparatus. In a step ST1, an image processing apparatus 20dv determines whether or not the coding target picture is a dependent view picture. The image processing apparatus 20dv proceeds to a step ST2 in the case where the coding target picture is a dependent view picture, and proceeds to a step ST9 in the case of a base view picture.

In step ST2, the image processing apparatus 20dv conducts parallax prediction on a coding target macroblock. The motion/parallax prediction compensator 42 of the image processing apparatus 20dv conducts parallax prediction using image data of the coding target macroblock and base view image data, detects a parallax vector, and proceeds to a step ST3.

In step ST3, the image processing apparatus 20dv acquires a parallax vector. The quantization controller 45 of the image processing apparatus 20dv acquires a parallax vector detected by the motion/parallax prediction compensator 42 and proceeds to a step ST4.

In step ST4, the image processing apparatus 20dv determines a protected area. The quantization controller 45 of the image processing apparatus 20dv compares feedback information generated in a step ST8 later described to the parallax vector, determines a protected area, and proceeds to a step ST5. In the case where, for example, statistics used as a basis for determining a protected area are taken as feedback information as discussed later, the quantization controller 45 determines a macroblock of a 3D object positioned in front with a parallax vector greater than the feedback information to be a protected area.

In step ST5, the image processing apparatus 20dv determines a quantization step size. The quantizer 25 of the image processing apparatus 20dv determines a quantization step size on the basis of the protected area determination results in step ST4, and proceeds to a step ST6. The quantizer 25 modifies the quantization step size on the basis of the protected area determination results, reducing the quantization step size for image portions of 3D objects positioned in front, for example.

In step ST6, the image processing apparatus 20dv conducts a coding process. With the prediction image/optimal mode selector 43, the image processing apparatus 20dv compares a cost function value supplied from the intra predictor 41 to a cost function value supplied from the motion/parallax prediction compensator 42. The image processing apparatus 20dv, on the basis of the comparison results, selects the prediction mode with the lesser cost function value as the optimal mode with the best coding efficiency. The image processing apparatus 20dv also conducts a coding process using prediction image data generated in the optimal mode. Additionally, the image processing apparatus 20dv conducts the coding process using the quantization step size determined in step ST5.

The processing from step ST2 to step ST6 is conducted in this way on each macroblock in a picture, and when processing is complete for a macroblock the process proceeds to a step ST7.

In step ST7, the image processing apparatus 20dv determines whether or not the processing from step ST2 to step ST6 has finished for all macroblocks in the coding target picture. When an unprocessed macroblock remains, the image processing apparatus 20dv returns to step ST2 and conducts the processing from step ST2 to step ST6 on a new unprocessed macroblock. Meanwhile, the image processing apparatus 20dv proceeds to a step ST8 when processing has finished for all macroblocks.

In step ST8, the image processing apparatus 20dv generates feedback information. The quantization controller 45 of the image processing apparatus 20dv generates feedback information from parallax vectors for a single picture that are obtained by conducting the processing from step ST2 to step ST6 on each macroblock in a picture. The feedback information is used in the coding process for the next picture. The quantization controller 45 takes statistics used as a basis for determining a protected area as the feedback information. For example, the quantization controller 45 may take an average value of parallax vectors in a single picture as feedback information. Also, the quantization controller 45 may add a correction value depending on a parallax vector distribution to the average value, and take that as feedback information. However, parallax vector statistics are not limited to average values, and median values, etc. may also be used.

In step ST9, the image processing apparatus 20dv conducts a coding process similar to the related art in the case where the coding target picture is a base view picture. In other words, a coding process is conducted without conducting parallax prediction.

According to the first operation, in a coding process for a dependent view, an image of a 3D object positioned in front, for example, is taken to be a protected area on the basis of parallax vectors obtained by parallax prediction. Consequently, image quality is protected for a 3D object positioned in front that readily draws attention, and the subjective image quality of a multi-view image can be improved.

<3-2. Second Operation of Image Processing Apparatus>

In a second operation of an image processing apparatus, the case of determining a protected area using a parallax vector of a coding target block and a parallax vector detected in the immediately preceding already-coded block will be described. Herein, in the second operation, similarly to the first operation, the horizontal components of parallax vectors are used to determine a protected area in the case of generating base view and dependent view image data by differentiating the positions of the left view and the right view in the horizontal direction only.

Figure 5:
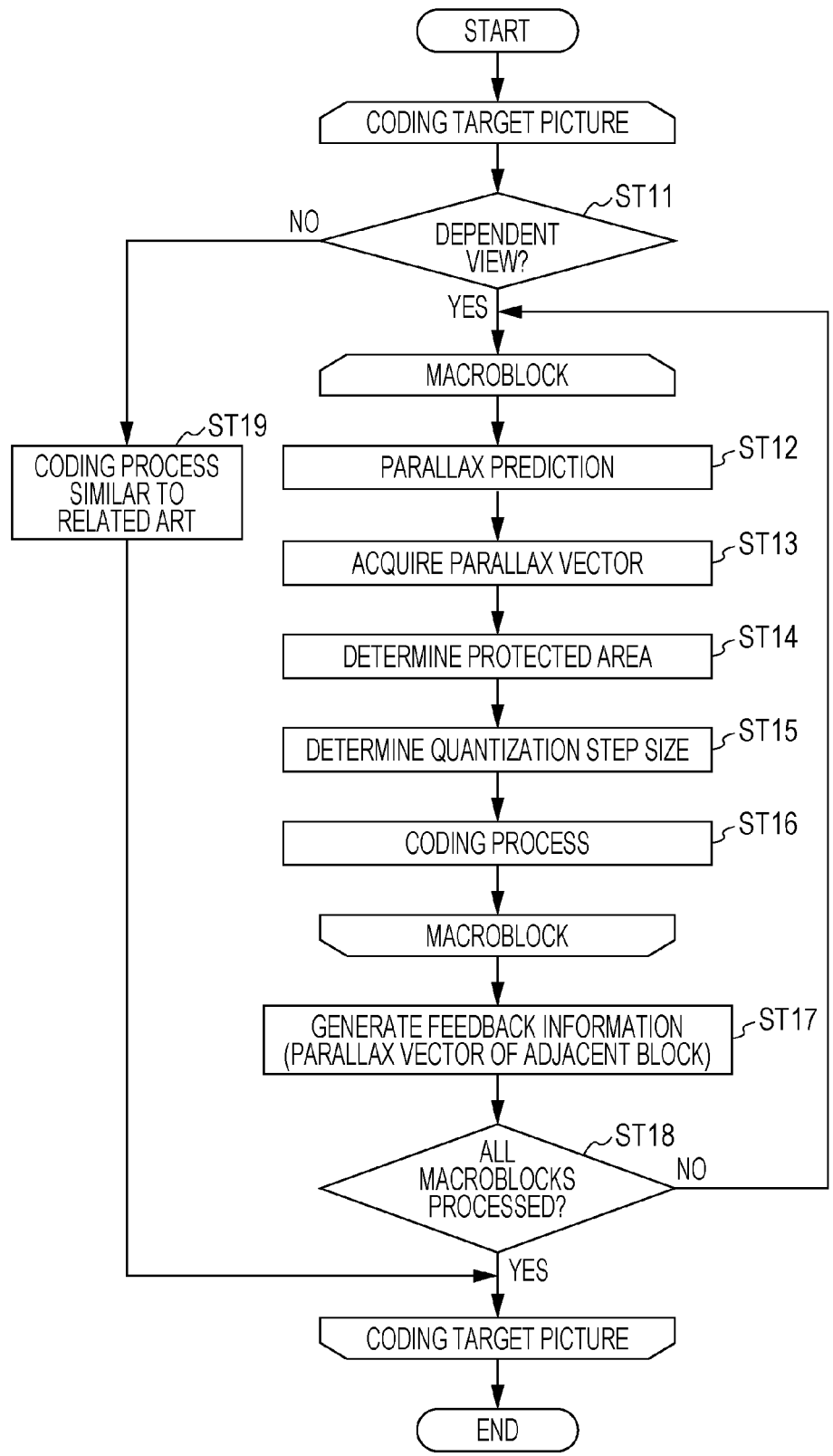
FIG. 5 is a flowchart illustrating a second operation of an image processing apparatus.

FIG. 5 is a flowchart illustrating a second operation of an image processing apparatus. In a step ST11, an image processing apparatus 20dv determines whether or not the coding target picture is a dependent view picture. The image processing apparatus 20dv proceeds to a step ST12 in the case where the coding target picture is a dependent view picture, and proceeds to a step ST19 in the case of a base view picture.

In step ST12, the image processing apparatus 20dv conducts parallax prediction on a coding target macroblock. The motion/parallax prediction compensator 42 of the image processing apparatus 20dv conducts parallax prediction using image data of the coding target macroblock and base view image data, detects a parallax vector, and proceeds to a step ST13.

In step ST13, the image processing apparatus 20dv acquires a parallax vector. The quantization controller 45 of the image processing apparatus 20dv acquires a parallax vector detected by the motion/parallax prediction compensator 42 and proceeds to a step ST14.

In step ST14, the image processing apparatus 20dv determines a protected area. The quantization controller 45 of the image processing apparatus 20dv compares feedback information generated in a step ST17 later described to the parallax vector, determines a protected area, and proceeds to a step ST15. In the case where, for example, a parallax vector of an immediately preceding already-coded macroblock is taken as feedback information as discussed later, the quantization controller 45 determines a boundary of a 3D object with a parallax vector greater than the feedback information to be a protected area.

In step ST15, the image processing apparatus 20dv determines a quantization step size. The quantizer 25 of the image processing apparatus 20*dv* determines a quantization step size on the basis of the protected area determination results in step ST14, and proceeds to a step ST16. The quantizer 25 modifies the quantization step size on the basis of the protected area determination results, reducing the quantization step size for a boundary portion of a 3D object, for example.

In step ST16, the image processing apparatus 20*dv* conducts a coding process. With the prediction image/optimal mode selector 43, the image processing apparatus 20*dv* compares a cost function value supplied from the intra predictor 41 to a cost function value supplied from the motion/parallax prediction compensator 42. The image processing apparatus 20*dv*, on the basis of the comparison results, selects the prediction mode with the lesser cost function value as the optimal mode with the best coding efficiency. The image processing apparatus 20*dv* also conducts a coding process using prediction image data generated in the optimal mode. Additionally, the image processing apparatus 20*dv* conducts the coding process using the quantization step size determined in step ST15, and proceeds to a step ST17.

In step ST17, the image processing apparatus 20*dv* generates feedback information. The quantization controller 45 of the image processing apparatus 20*dv* takes the parallax vector obtained by conducting the processing from step ST12 to step ST16 on a macroblock to be feedback information used in the coding process of the next macroblock, and proceeds to a step ST18.

In step ST18, the image processing apparatus 20*dv* determines whether or not the processing from step ST12 to step ST16 has finished for all macroblocks in the coding target picture. When an unprocessed macroblock remains, the image processing apparatus 20*dv* returns to step ST12 and conducts the processing from step ST12 to step ST16 on a new unprocessed macroblock. Meanwhile, the image processing apparatus 20*dv* deletes the feedback information and codes the next coding target picture when processing has finished for all macroblocks.

In step ST19, the image processing apparatus 20*dv* conducts a coding process similar to the related art in the case where the coding target picture is a base view picture. In other words, a coding process is conducted without conducting parallax prediction.

According to the second operation, in a coding process for a dependent view, a boundary of a 3D object is taken to be a protected area on the basis of the parallax vector of an immediately preceding coding target macroblock. Consequently, image quality is protected for a boundary portion of a 3D object, and the subjective image quality of a multi-view image can be improved.

<3-3. Third Operation of Image Processing Apparatus>

In a third operation of an image processing apparatus, the case of determining a protected area using error from when compensating on the basis of the parallax vector of a coding target macroblock and error computed for an already-coded picture will be described.

Figure 6:
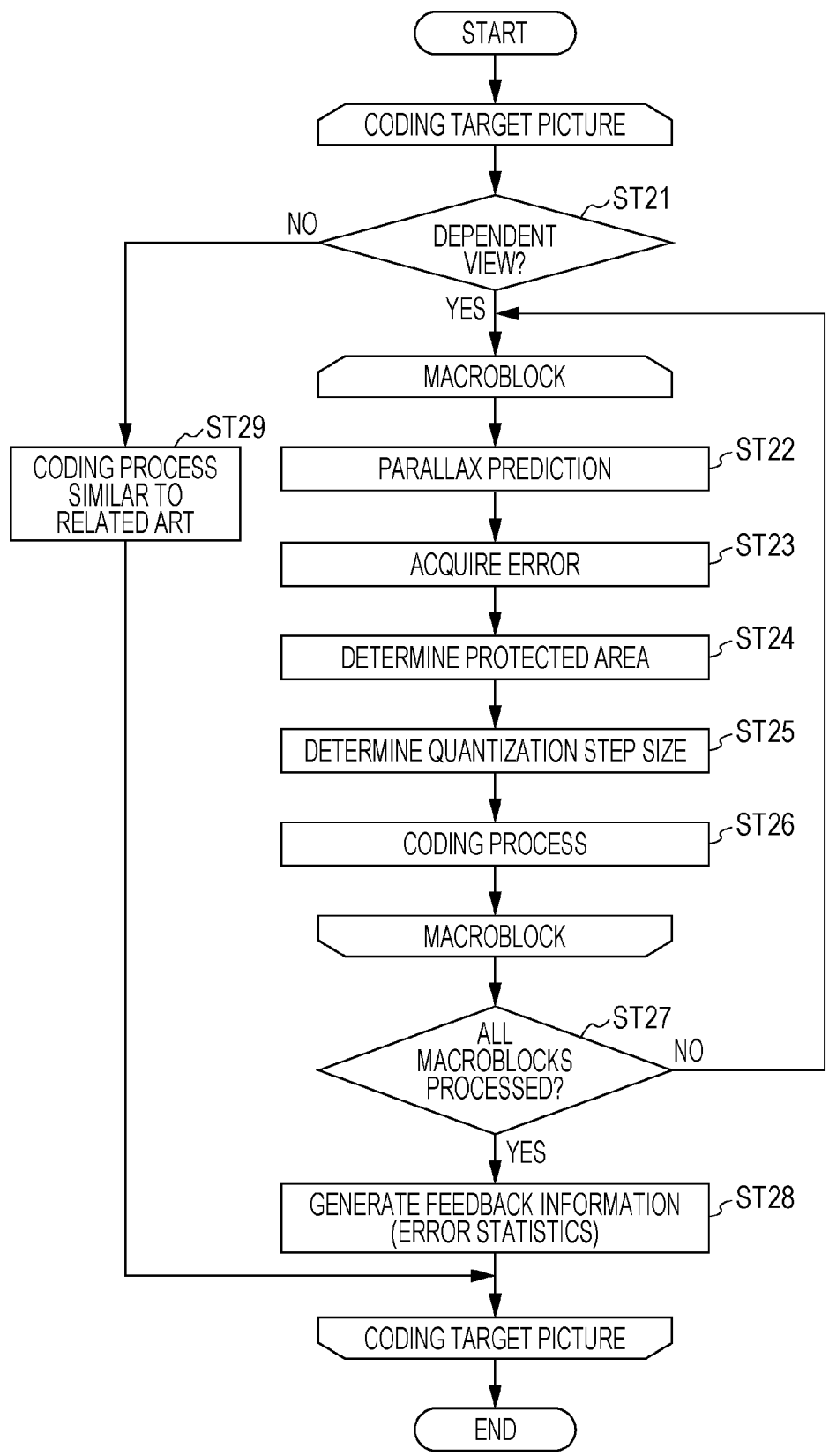
FIG. 6 is a flowchart illustrating a third operation of an image processing apparatus.

FIG. 6 is a flowchart illustrating a third operation of an image processing apparatus. In a step ST21, an image processing apparatus 20*dv* determines whether or not the coding target picture is a dependent view picture. The image processing apparatus 20*dv* proceeds to a step ST22 in the case where the coding target picture is a dependent view picture, and proceeds to a step ST29 in the case of a base view picture.

In step ST22, the image processing apparatus 20*dv* conducts parallax prediction on a coding target macroblock. The motion/parallax prediction compensator 42 of the image processing apparatus 20*dv* conducts parallax prediction using image data of the coding target macroblock and base view image data and detects a parallax vector.

Additionally, the motion/parallax prediction compensator 42 conducts reference picture compensation using the detected parallax vector, computes the error (SAD: Sum of Absolute Differences, for example) with the coding target macroblock, and proceeds to a step ST23.

In step ST23, the image processing apparatus 20*dv* acquires error. The quantization controller 45 of the image processing apparatus 20*dv* acquires error computed by the motion/parallax prediction compensator 42 and proceeds to a step ST24.

In step ST24, the image processing apparatus 20*dv* determines a protected area. The quantization controller 45 of the image processing apparatus 20*dv* compares feedback information generated in a step ST28 later described to the error, determines a protected area, and proceeds to a step ST25. At this point, a macroblock with a large error has a low parallax prediction efficiency, and there is a high probability that the area is an occlusion. An occlusion area is an area which exists in the coding target (reference) picture, but which does not exist in the reference (coding target) area. An area where an occlusion due to parallax occurs may be a boundary area where the parallax changes greatly, such as a boundary area between a 3D object projecting out in front and the background, for example. Consequently, in the case where, for example, the average value of the error in a single picture is taken as feedback information as discussed later, the quantization controller 45 determines a macroblock with an error greater than the feedback information to be a protected area. Herein, an occlusion area refers to an area which is visible in either the base view or the dependent view, but which is hidden and not visible in the other view, for example.

In step ST25, the image processing apparatus 20*dv* determines a quantization step size. The quantizer 25 of the image processing apparatus 20*dv* determines a quantization step size on the basis of the protected area determination results in step ST24, and proceeds to a step ST26. The quantizer 25 modifies the quantization step size on the basis of the protected area determination results, reducing the quantization step size for a boundary portion of a 3D object, for example.

In step ST26, the image processing apparatus 20*dv* conducts a coding process. With the prediction image/optimal mode selector 43, the image processing apparatus 20*dv* compares a cost function value supplied from the intra predictor 41 to a cost function value supplied from the motion/parallax prediction compensator 42. The image processing apparatus 20*dv*, on the basis of the comparison results, selects the prediction mode with the lesser cost function value as the optimal mode with the best coding efficiency. The image processing apparatus 20*dv* also conducts a coding process using prediction image data generated in the optimal mode. Additionally, the image processing apparatus 20*dv* conducts the coding process using the quantization step size determined in step ST25.

The processing from step ST22 to step ST26 is conducted in this way on each macroblock in a picture, and when processing is complete for a macroblock the process proceeds to a step ST27.

In step ST27, the image processing apparatus 20*dv* determines whether or not the processing from step ST22 to step ST26 has finished for all macroblocks in the coding target picture. When an unprocessed macroblock remains, the image processing apparatus 20*dv* returns to step ST22 and conducts the processing from step ST22 to step ST26 on a new unprocessed macroblock. Meanwhile, the image processing apparatus 20*dv* proceeds to a step ST28 when processing has finished for all macroblocks.

In step ST28, the image processing apparatus 20*dv* generates feedback information. The quantization controller 45 of the image processing apparatus 20*dv* generates feedback information from error for a single picture that is obtained by conducting the processing from step ST22 to step ST26 on each macroblock in a picture. The feedback information is used in the coding process for the next picture. The quantization controller 45 computes statistics used as a basis for determining a protected area from the error of an already-coded picture, and takes them as feedback information. For example, the quantization controller 45 may take the average value of error in a single picture as feedback information. Also, the quantization controller 45 may add a correction value depending on the distribution of error in a single picture to the average value of error in a single picture, and take the result as feedback information.

In step ST29, the image processing apparatus 20*dv* conducts a coding process similar to the related art in the case where the coding target picture is a base view picture. In other words, a coding process is conducted without conducting parallax prediction.

According to the third operation, in a coding process for a dependent view, an boundary of a 3D object positioned is taken to be a protected area on the basis of error obtained by parallax prediction. Consequently, image quality is protected for a boundary portion of a 3D object, and the subjective image quality of a multi-view image can be improved.

<3-4. Other Operation of Image Processing Apparatus>

An image processing apparatus may also conduct the above-described first through third operations in combination, rather than the case of conducting first through third operations individually. In the first operation described above, the image quality of a 3D object positioned in front can be protected. Also, in the second operation or the third operation, the image quality of a boundary area of a 3D object can be protected. Consequently, by conducting the first operation and the second operation or the first operation and the third operation in combination, the image quality of an image of a 3D object and the image quality of an image of its boundary area are protected, and the subjective image quality of a multi-view image can be improved.

Also, in the case of conducting the second operation, if for example the threshold value compared against a parallax vector is smaller than an optimal level, then over-detection of a protected area may occur, and an area differing from a boundary area of a 3D object may also be determined as a protected area. At this point, if the third operation is combined with the second operation and a protected area is determined by also using error rather than just a parallax vector, then occlusion areas are also determined on the basis of error. Consequently, if an area having a parallax vector and error that are greater than their threshold values is determined as a protected area, a boundary of a 3D object can be more precisely determined as a protected area compared to the case of determining a protected area with either the second operation or the third operation.

Also, in the above-described operation, an area whose parallax vector and error are greater than their threshold values is taken to be a protected area, but it is also possible to take an area whose parallax vector and error are less than their threshold values to be a protected area. For example, consider the case where an object different from the object of interest is positioned in front and the object of interest is set farther back. In this case, it is possible to also protect the image quality of the object of interest by taking an area whose parallax vector and error are less than their threshold values to be a protected area.

It may also be configured such image quality protection is additionally conducted on base view images rather than just dependent view images. In this case, an image processing apparatus that codes base view image data generates prediction image data by temporal prediction, determines a protected area on the basis of information obtained by parallax prediction, and conducts adaptive quantization according to the determination results. In so doing, the image quality of an object of interest is protected in base view and dependent view images, and the subjective image quality of a multi-view image can be improved.

<4. Configuration in the Case of Conducting Image Coding by Software Processing>

Additionally, an image processing apparatus may also be a computer that executes the above-described series of processes according to a program.

Figure 7:
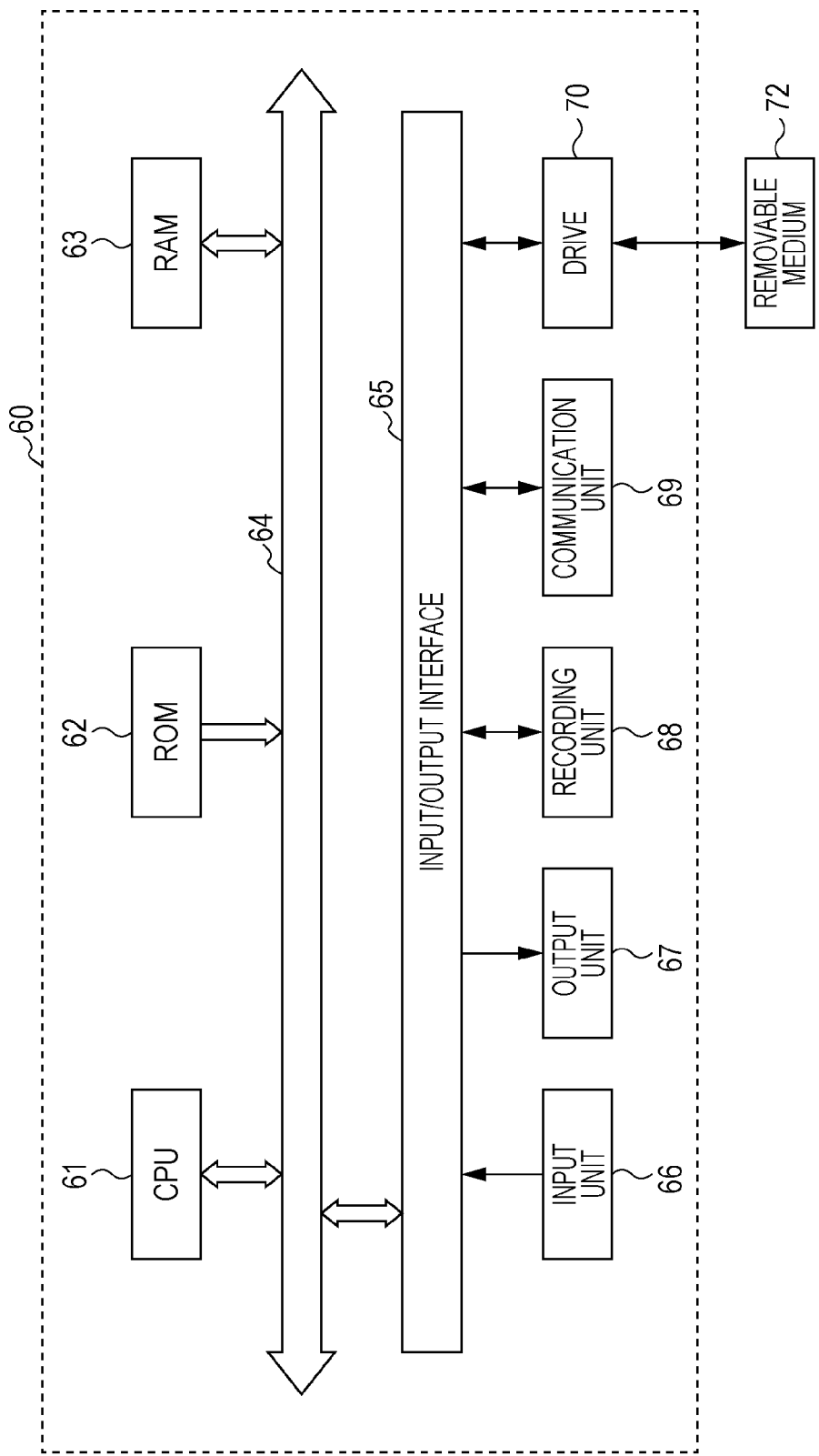
FIG. 7 is illustrates a configuration in the case of conducting image coding by software processing.

FIG. 7 illustrates an exemplary configuration of a computer that executes the above-described series of processes according to a program. The central processing unit (CPU) 61 of a computer 60 executes various processes in accordance with a computer program recorded in read-only memory (ROM) 62 or a recording unit 68.

Computer programs executed by the CPU 61 and data, etc. are stored as appropriate in random access memory (RAM) 63. The CPU 61, ROM 62, and RAM 63 are coupled to each other by a bus 64.

An input/output interface 65 is also coupled to the CPU 61 via the bus 64. Coupled to the input/output interface 65 is an input unit 66 such as a touch panel, keyboard, mouse, microphone, etc. and an output unit 67 such as a display, etc. The CPU 61 executes various processes corresponding to commands input from the input unit 66, and outputs processing results to the output unit 67.

The recording unit 68 coupled to the input/output interface 65 may be realized by a hard disk or solid-state drive (SSD), for example, and records computer programs executed by the CPU 61 and various data. A communication unit 69 communicates with external apparatus via a wired or wireless communication medium such as the Internet, a local area network, or other network, or a digital broadcast. The computer apparatus 60 may also acquire computer programs via the communication unit 69 and record the programs in the ROM 62 or the recording unit 68.

When a magnetic disk, an optical disc, a magneto-optical disc, semiconductor memory, or other removable medium 72 is loaded into a drive 70, the drive 70 drives the medium and acquires computer programs, data, etc. recorded thereon. Acquired computer programs and data are transferred to the ROM 62, the RAM 63, or the recording unit 68 as appropriate.

The CPU 61 reads out and executes a computer program that conducts the above-described series of processes, conducting a coding process on image data of a multi-view image recorded in the recording unit 68 or the removable medium 72, or on image data of a multi-view image supplied via the communication unit 69.

However, the disclosed technology is not to be interpreted as being limited to the above-described embodiment. For example, a multi-view image is not limited to three images, and may also be a two-view image. This embodiment of the disclosed technology discloses the disclosed technology by way of example, and obviously persons skilled in the art may make modifications or substitutions to the embodiment without departing from the principal matter of the disclosed technology. In other words, the principal matter of the disclosed technology should be judged upon consultation of the claims.

The present disclosure contains subject matter related to that disclosed in Japanese Priority Patent Application JP 2010-161658 filed in the Japan Patent Office on Jul. 16, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a quantizer configured to quantize orthogonal transform coefficients of a difference in block units between a coding target picture and a prediction image;
   a predictor configured to conduct parallax prediction utilizing correlations between the coding target picture and a picture whose view differs from the coding target picture; and
   a quantization controller configured to determine a protected area that protects image quality from the parallax prediction results, and reduce a quantization step size of the quantizer for quantization of the protected area;
   wherein:
      the quantization controller is configured to determine the protected area by using at least one from among a parallax vector detected by the parallax prediction and error from when parallax compensation was conducted using the parallax vector; and
      in a case of using a parallax vector detected by the parallax prediction, the quantization controller is configured to determine if a coding target block image is the protected area at least in part on the basis of at least one from among comparison results between a parallax vector of an already-coded picture and the coding target block and comparison results between a parallax vector of an immediately preceding already-coded block and a parallax vector of the coding target block.

2. The image processing apparatus according to claim 1, wherein the quantization controller is configured to determine a coding target block whose parallax vector is greater than statistics used as a basis for determining a protected area which are computed from the parallax vector of the already-coded picture, and a coding target block whose parallax vector is greater than the parallax vector of an immediately preceding already-coded block, to be the protected area.

3. The image processing apparatus according to claim 1, wherein
   the quantization controller is configured to determine the protected area using horizontal components of a parallax vector detected by the parallax prediction.

4. The image processing apparatus according to claim 1, wherein in a case of using error from when the parallax compensation was conducted, the quantization controller is configured to determine if a coding target block image is the protected area at least in part on the basis of comparison results between error of an already-coded picture and parallax of the coding target block.

5. The image processing apparatus according to claim 4, wherein the quantization controller is configured to determine a coding target block whose error is greater than statistics used as a basis for determining a protected area which are computed from the error of the already-coded picture to be the protected area.

6. An image processing method comprising acts of:
quantizing, by at least one computer processor, orthogonal transform coefficients of a difference in block units between a coding target picture and a prediction image;
conducting parallax prediction, by the at least one computer processor, utilizing correlations between the coding target picture and a picture whose view differs from the coding target picture; and
determining, by the at least one computer processor, a protected area that protects image quality from the parallax prediction results, and reducing a quantization step size for quantization of the protected area;
wherein:
   the act of determining the protected area comprises the at least one computer processor using at least one from among a parallax vector detected by the parallax prediction and error from when parallax compensation was conducted using the parallax vector; and
   in a case of the at least one computer processor using a parallax vector detected by the parallax prediction to determine the protected area, a determination whether a coding target block image is the protected area is based at least in part on at least one from among comparison results between a parallax vector of an already-coded picture and the coding target block and comparison results between a parallax vector of an immediately preceding already-coded block and a parallax vector of the coding target block.

7. The image processing method according to claim 6, wherein the act of determining comprises the at least one computer processor determining a coding target block whose parallax vector is greater than statistics used as a basis for determining a protected area which are computed from the parallax vector of the already-coded picture, and a coding target block whose parallax vector is greater than the parallax vector of an immediately preceding already-coded block, to be the protected area.

8. The image processing method according to claim 6, wherein the act of determining the protected area comprises the at least one computer processor using horizontal components of a parallax vector detected by the parallax prediction.

9. The image processing method according to claim 6, wherein, in a case of the at least one computer processor using error from when the parallax compensation was conducted, the act of determining comprises the at least one computer processor determining whether a coding target block image is the protected area at least in part on the basis of comparison results between error of an already-coded picture and parallax of the coding target block.

10. The image processing method according to claim 9, wherein the act of determining comprises the at least one computer processor determining a coding target block whose error is greater than statistics used as a basis for determining a protected area which are computed from the error of the already-coded picture to be the protected area.

* * * * *